Patented Mar. 11, 1952

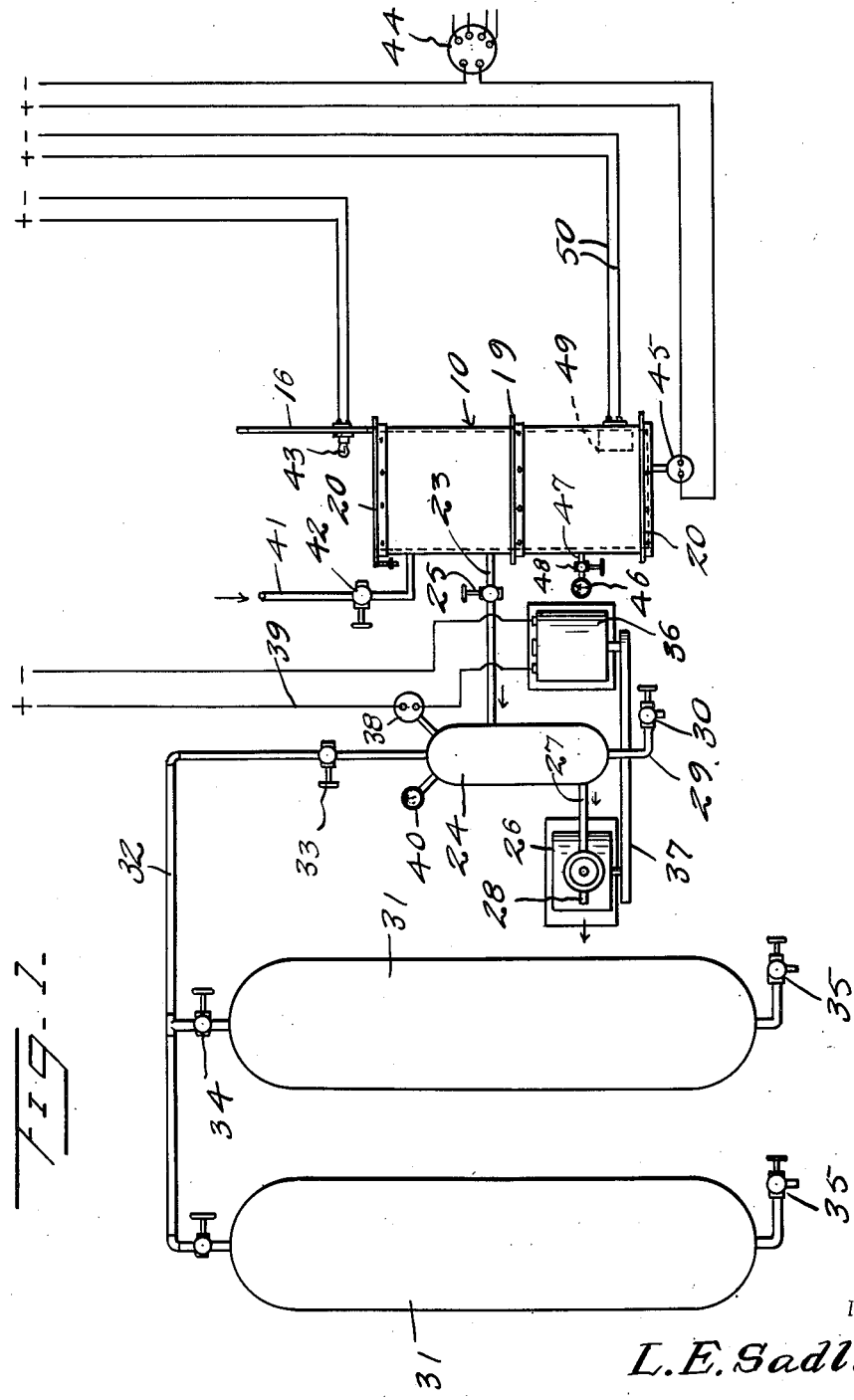

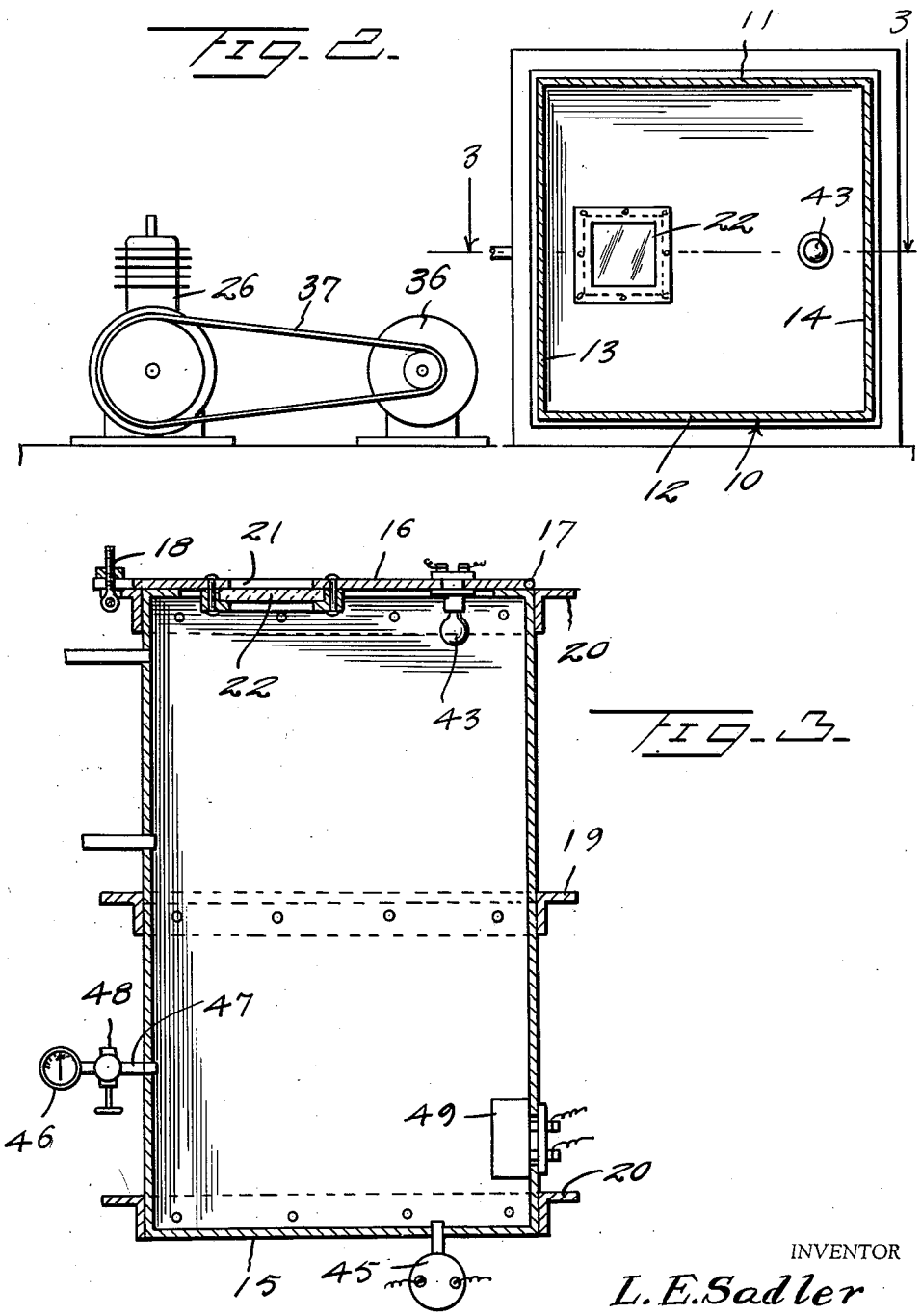

2,588,770

UNITED STATES PATENT OFFICE 2,588,770

APPARATUS FOR STUNNING OR KILLING ANIMALS

Luther E. Sadler, Los Angeles, Calif., assignor of twenty-five per cent to Byron R. Bentley, Los Angeles, Calif.

Application October 31, 1949, Serial No. 124,549

1 Claim. (Cl. 128—1)

This invention relates to apparatus for stunning or killing animals.

It is an object of this invention to provide an improved apparatus for humanely killing or stunning animals without subjecting the animals to bodily injury. The animal is placed in a closed chamber which is sealed air tight, whereupon the air in the chamber is evacuated to a predetermined degree. The time required to evacuate the chamber is reduced by the employment of a series of low pressure air tanks which will reduce the air pressure in the chamber to a predetermined point which is sufficient to either kill or stun the animal.

Another object of this invention is to provide apparatus which will perform the desired operation quickly and without physical injury to the animal, the apparatus being such that if desired the animal may be rendered unconscious or may be killed. Where the animal is to be killed, the animal is first subjected to a low air pressure sufficient to cause sleepiness or unconsciousness, and then subjected to a lower air pressure which is sufficient to kill. When it is desired to only stun the animal and render it unconscious, the animal is subjected to a predetermined low air pressure for a relatively short time.

With the above and other objects in view, my invention consists in the arrangement, combination and details of construction disclosed in the drawings and specification, and then more particularly pointed out in the appended claim.

In the drawings,

Figure 1 is a diagrammatic view of a lethal and stunning apparatus constructed according to an embodiment of this invention, Figure 2 is a fragmentary sectional view showing the chamber and the evacuator, Figure 3 is a sectional view taken on the line 3—3 of Figure 2.

Referring to the drawings, the numeral 10 designates generally a chamber which in the present instance is shown as polygonal in transverse section, being formed of top and bottom walls 11 and 12, and opposite side walls 13 and 14. The chamber 10 also includes an end wall 15 and a closure 16 which is hinged as at 17 and is adapted to be tightly secured in airtight position by means of securing bolts 18. The chamber 10 is reinforced by means of a series of reinforcing angle members 19 and 20, the angle members 20 being disposed adjacent the ends of the chamber 10, whereas the angle member 19 is positioned between the ends of the chamber.

The closure 16 is formed with a window opening 21 within which a transparent panel 22 is secured so that the condition of the animal or animals in the chamber can be visibly determined.

The chamber 10 is connected by means of a pipe 23 to a relatively small ballast tank 24, and a valve 25 is interposed in the pipe 23. A suction pump 26 of conventional construction is connected by means of a pipe 27 to the tank 24, and the pump 26 also includes an exhaust 28 for exhausting the air which is withdrawn from the tank 24.

The tank 24 has a drain pipe 29 connected with one end thereof, and a valve 30 is connected with the pipe 29. The valve 30 will be normally closed during the operation of this system.

A pair of relatively large ballast tanks 31 are connected by means of a pipe 32 to the opposite end of the ballast tank 24, and a valve 33 is interposed in the pipe 32. Separate valves 34 are connected between each tank 31 and the pipe 32 so that either or both of the tanks 31 may be coupled with the ballast tank 24.

A drain valve 35 is connected with each tank 31 for draining the tank as may be desired. The air pump 26 is operated by means of a power member 36 which in the present instance is a motor connected with the pump 26 by means of an endless belt or driving connection 37. A vacuum operated switch 38 is connected to the ballast tank 24 and interposed in one of the conductors 39 which connects the motor 36 to a source of electric current supply.

The switch 38 is connected to the ballast tank 24 and a meter 40 is also connected with the tank 24 whereby the degree of evacuation of air in tank 24 may be visibly determined. The meter 40 may be a conventional altimeter such as is used in airplanes for determining air pressure and the height of an airplane.

An intake pipe 41 is connected with the chamber 10, and a manually operated valve 42 is interposed in the pipe 41. A light 43 is carried by the closure 16, being disposed on the inner side of the closure 16 so that the interior of the chamber 10 may be lighted for visibly determining the condition of the animal or animals positioned therein.

An electric timer 44 is adapted to be connected to a vacuum operated switch 45 which connected with the chamber 10.

A pressure meter 46 is connected with the chamber 10 by means of a pie 47, and a valve 48 is interposed in the pipe 47.

In the use and operation of this system, the animal which is to be either killed or stunned is placed within the chamber 10. This chamber may have any desired configuration and size and when the animal is placed therein the closure 16 is sealed. At this time valve 25 is opened and valve 33 is also opened. The valves 34 connected between pipe 32 and the two ballast tanks 31 are also opened. It is also assumed at the start of the operation that the tanks 24 and 31 will be substantially evacuated of air by operation of the exhaust pump 26. When air is withdrawn from chamber 10, this air will initially pass through tank 24 and into tanks 31. In the event it is desired to kill the animal without any physical injury, the animal may be initially subjected to a low pressure of predetermined degree for a predetermined period of time so as to thereby stun or render the animal unconscious, whereupon the low pressure may be further lowered so as to kill the animal. When the animal is being subjected to the low air pressure in chamber 10, valve 42 will be closed so that no air may enter the chamber.

With a device as hereinbefore described, the animal or animals will be killed without the presence of any noxious gases and through the medium of paralyzing the vital parts very quickly.

The chamber 10 may be termed as a lethal chamber, and it will be understood that where the law permits, this appparatus may be used for killing criminals.

I do not mean to confine myself to the exact details of construction herein disclosed, but claim all variations falling within the purview of the appended claim.

What I claim is:

An apparatus for killing animals without exterior evidence of injury comprised of an air tight chamber, an intermediate tank, a fluid connection between said tank and said chamber, a valve in said connection, and evacuating pump, a source of energy for actuating said pump, a fluid connection between said pump and said tank, a pressure responsive switch operable by the pressure in said tank for energizing and de-energizing said pump, a first main tank, a fluid connection between said main tank and said intermediate tank, a valve in said last mentioned connection, a second main tank, a connection between said second main tank and said connection between said first main tank and said intermediate tank, valve means in said last mentioned connection, and second valve means in said connection between said first main tank and said intermediate tank whereby either or both of said main tanks may be selectively placed in communication with said intermediate tank for evacuation by said pump.

LUTHER E. SADLER.

REFERENCES CITED

The following references are of record in the file of this patent:

UNITED STATES PATENTS

| Number | Name | Date |
| --- | --- | --- |
| 700,561 | Rowley et al. | May 20, 1902 |
| 1,224,180 | Lake | May 1, 1917 |
| 1,713,558 | Schollmeyer | May 21, 1929 |

FOREIGN PATENTS

| Number | Country | Date |
| --- | --- | --- |
| 4,455 | Great Britain | of 1876 |